Nov. 14, 1939.　　　R. P. BREESE　　　2,179,710
GEARSHIFT MECHANISM
Original Filed Nov. 11, 1935　　2 Sheets—Sheet 1
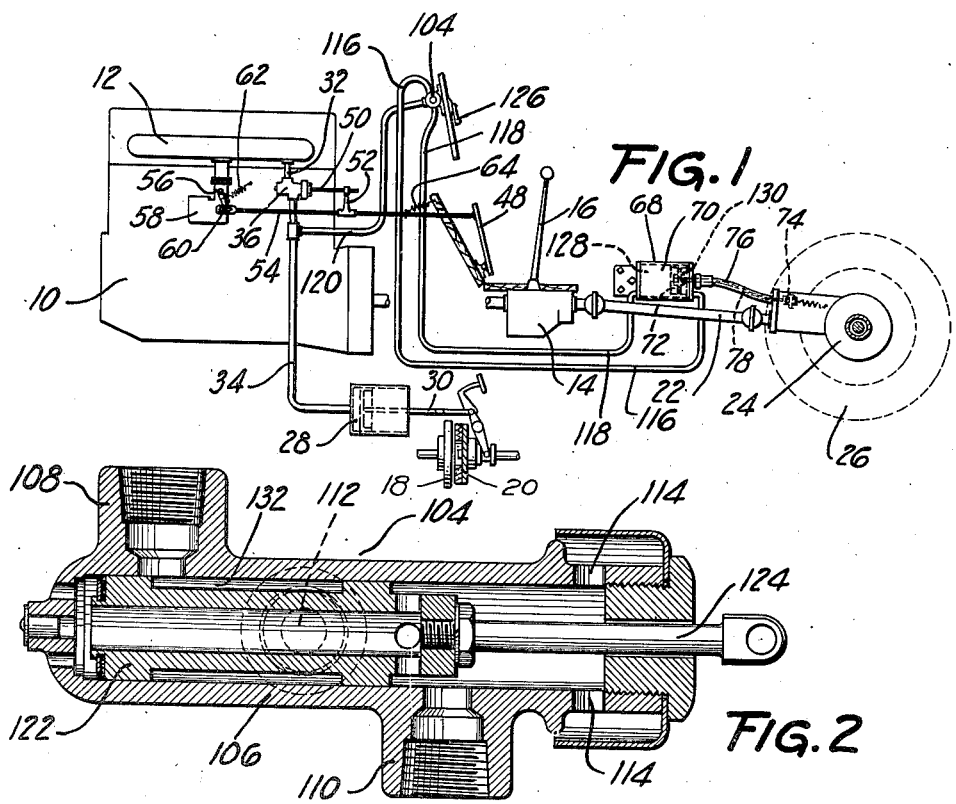
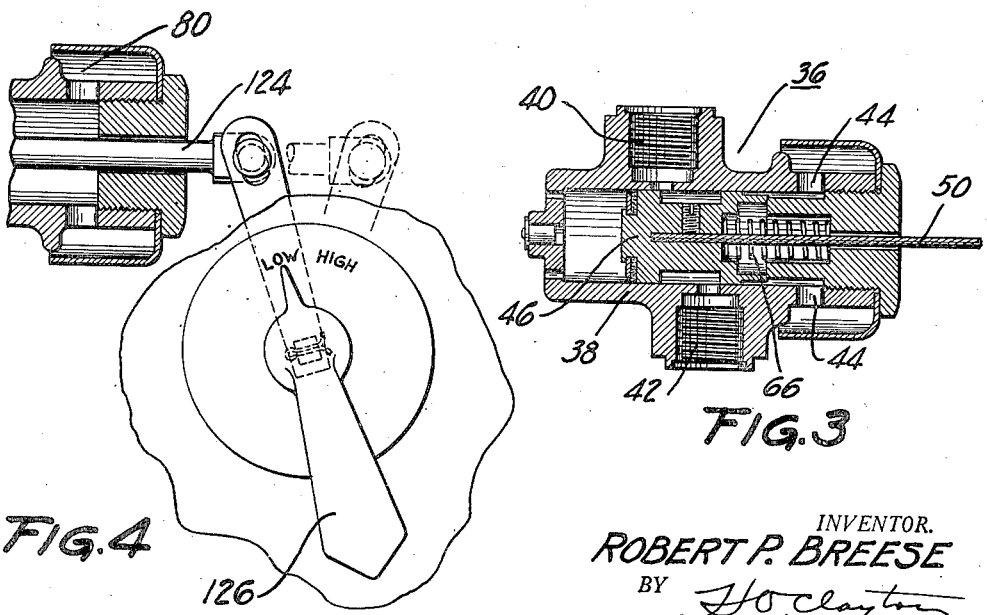
INVENTOR.
ROBERT P. BREESE
BY
ATTORNEY Nov. 14, 1939.   R. P. BREESE   2,179,710
GEARSHIFT MECHANISM
Original Filed Nov. 11, 1935   2 Sheets-Sheet 2

INVENTOR.
ROBERT P. BREESE
BY H. O. Clayton
ATTORNEY

Patented Nov. 14, 1939

2,179,710

UNITED STATES PATENT OFFICE 2,179,710

GEARSHIFT MECHANISM

Robert P. Breese, New York, N. Y., assignor to Bendix Products Corporation, South Bend, Ind., a corporation of Indiana Application November 11, 1935, Serial No. 49,156
Renewed October 2, 1939

2 Claims. (Cl. 192—.01)

This invention in its broadest aspect relates to new and useful improvements in the power plant of an automotive vehicle.

More specifically, the invention relates to gear shifting mechanism and is of particular utility when employed in connection with speed-changing and direction-reversing gearing commonly used in coupling internal-combustion engines of automobiles with the driving vehicle wheels or other propelling devices.

One object of the invention is to provide power operated means for operating a two-speed transmission mechanism, preferably mounted on the differential housing of an automotive vehicle or mounted within said housing and constituting a part of the differential and rear axle construction. Such a mechanism is designed to supplement the conventional change-speed transmission by providing, in addition to the conventional three-speeds forward and reverse driving ratios, two additional driving ratios between the power plant and the rear wheels. Thus for each of the two settings of the supplemental transmission there are provided, by the standard transmission, four different gear ratios, making eight different ratios in all.

Such a mechanism provides a more efficient power plant, both in climbing hills and on level ground, there being a quiet performance of the motor at high vehicle speeds, and accordingly less wear and tear on the motor parts. On the boulevard or in the country with the car moving at say twenty to sixty miles per hour the two-speed transmission may be operated to select its high ratio; thereupon the car continues at the same speed and the motor speed drops say one-third of its former speed. There is thus provided a mechanism that insures a minimum of noise and vibration, saves wear and tear on moving parts, and in general prolongs the life not only of the motor but of the entire automobile.

According to one desirable construction, there is provided a pressure differential operated double-acting motor operably connected to a so-called two-speed rear axle mechanism, said motor being controlled by a manually operable double three-way selector valve.

Yet another object of the invention is to provide power means for operating the standard clutch of the vehicle, power means for operating a two-speed rear axle mechanism, and valvular means for controlling both of said power means including a master valve operable by the accelerator, and further including a manually operable selector valve.

Other objects of the invention and other desirable details of construction and combinations of parts will become apparent from a detailed description of certain embodiments of the invention described in detail in the following specification taken in conjunction with the accompanying drawings, in which:

Figure 1 is a diagrammatic view of one embodiment of clutch and transmission operating mechanism constituting my invention;

Figure 2 is a sectional view of the double three-way selector valve for in part controlling the transmission operating power means of the mechanism of Figure 1;

Figure 3 is a sectional view of the accelerator operated master or pilot three-way valve of the mechanism of Figure 1;

Figure 4 is a view disclosing the manually operable index means for operating the selector valve of Figure 2;

Figures 5, 6, 7:
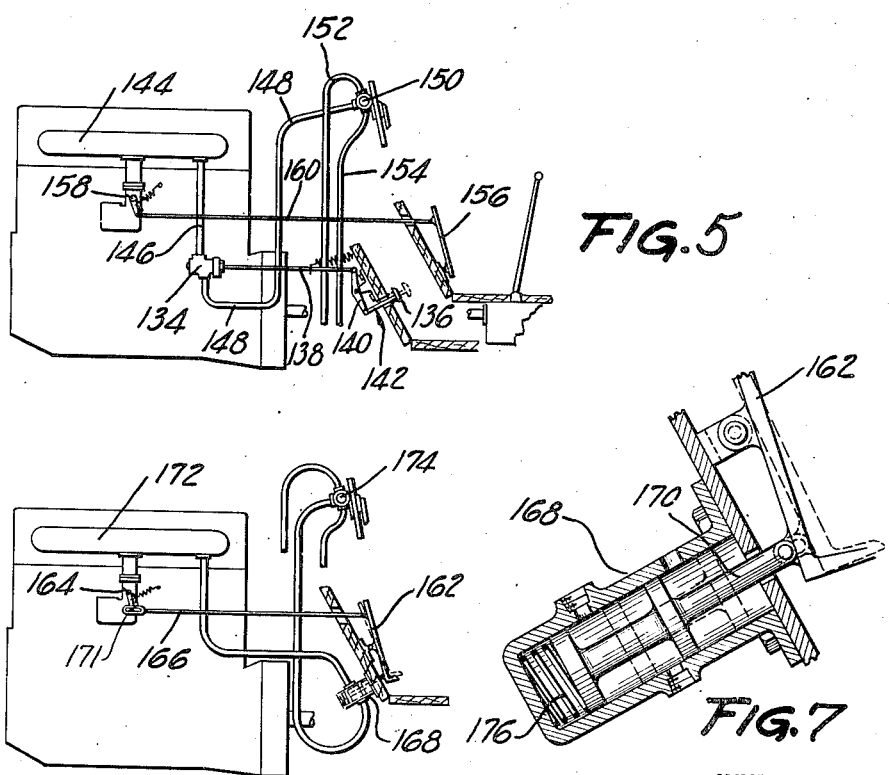
Figures 5 and 6 are partial diagrammatic views disclosing modifications of the mechanism of Figure 1, the variation therefrom residing in a means for operating the pilot valve.
Figure 7 is an enlarged sectional view of the accelerator operated pilot valve of Figure 6.

Referring to the modification of the invention of Figure 1 of the drawings, there is disclosed certain of the elements of the vehicle power plant, including an internal-combustion engine 10 having an intake manifold 12, a conventional three-speeds forward and reverse transmission 14 operable by a gearshift lever 16, a conventional friction disc clutch interposed in the driving connection between the engine and transmission and comprising a driving element 18 and a driven element 20, a propeller shaft 22, and a conventional so-called two-speed rear axle or dual-ratio change-speed transmission mechanism 24 interconnecting the propeller shaft and rear wheels 26.

The invention has to do with power means for operating the clutch and two-speed rear axle mechanism, particularly the latter, and to this end there is provided a pressure differential operated motor 28 operably connected by a connecting rod 30 with the driven element 20 of the friction clutch. The motor 28 is placed in fluid transmitting connection with the manifold 12 as a source of vacuum power by conduits 32 and 34 interconnected by a three-way valve 36, detailed in Figure 3. The latter valve comprises a casing 38 ported at 40, 42 and 44 to provide (1) means for connection with the conduit 32 leading to the intake manifold; (2) means providing a connection with the conduit 34 leading to the clutch operating motor 28; and (3) a vent to the atmosphere. The three-way valve further comprises a reciprocable plunger 46 operably connected to an accelerator pedal 48 by connections 50, 52 and 54. The connection 54, as will appear from Figure 1 of the drawings, serves to operate a butterfly valve 56 of the carburetor mechanism 58, a lost motion connection 60 being incorporated in said connection to operate the valve 36 prior to an operation of the valve 56. The latter is moved to its closed position by a spring 62.

In operation, upon release of the accelerator, the butterfly valve 56 is first closed and the valve plunger 46 then moved, by an accelerator return spring 64, to a position disclosed in Figure 3 to interconnect the manifold with the clutch motor to thereby evacuate the latter and disengage the clutch. It is, of course, well known to those versed in this art that at closed throttle the intake manifold is evacuated to a degree sufficient to energize a clutch operating motor and likewise energize other vacuum operated accessories, e. g., a fuel pump or a windshield wiper.

Upon depressing the accelerator, a valve spring 66 functions to move the plunger 46 to the left, Figure 3, to cut off the connection between the manifold and motor and vent the latter to atmosphere via ports 44. The motor 28 is thus deenergized to permit the conventional clutch springs to reengage the clutch.

The aforementioned clutch operating mechanism is not claimed herein, inasmuch as the same constitutes the invention of N. W. Kliesrath, described, disclosed and claimed in his application No. 540,827, filed May 29, 1931.

The important feature of the instant invention resides in the power means for operating the two-speed rear axle mechanism 24. Referring again to Figure 1 of the drawings, there is disclosed a double-ended pressure differential operated motor 68 comprising a casing 70 and a piston or power element 72 of the latter being operably connected to a crank arm 74 of the two-speed rear axle mechanism 24 by a Bowden type of transmission power mechanism, the latter comprising a flexible conduit 76 housing a flexible cable 78 connected to the piston 72.

The energization and deenergization of the motor 68 to operate the aforementioned transmission is controlled jointly by the previously described pilot valve 36 and by a double three-way or so-called four-way selector valve 104, detailed in Figures 2 and 4. The latter valve comprises a tubular casing 106 ported at 108, 110, 112 and 114 to provide connections respectively with a conduit 116 leading to one end of the motor casing 70, a conduit 118 leading to the other end of the casing 70, a conduit 120 leading to the previously referred to conduit 34 and with the atmosphere. A tubular valve member 122 reciprocably mounted within the tubular valve casing 106, is selectively operated, through the intermediary of a link 124, by a manually operated indexing handle 126, Figure 4, preferably conveniently mounted in the instrument panel of the vehicle.

Referring now to the operation of the above-described mechanism, with the engine idling and the accelerator released, the clutch is disengaged, as previously described, and a source of vacuum is provided to energize the motor 68. The operator may now move the selector valve 104 to the low gear position of Figure 4, thereby interconnecting a compartment 128 of the motor with the atmosphere via conduit 118 and valve ports 110 and 114 and interconnecting a compartment 130 of the motor with the intake manifold via conduit 32, valve 36, conduit 34, conduit 120, valve port 112, a recess 132 in the valve plunger 122, valve port 108 and conduit 116. The motor 68 is thus energized, the piston 72 moving to the position disclosed in Figure 1 to establish a low gear ratio setting of the transmission mechanism 24.

In addition to the operation of the transmission just described, the conventional change-speed transmission 14 is properly operated to place the same in low gear, whereupon the accelerator is depressed to vent the clutch motor 28 and transmission operating motor 68 to deenergize the same. The clutch is thus engaged and the vehicle is started. Subsequent conventional operations of the transmission 14 will then step up the speed of the vehicle as desired.

When the vehicle is under way at cruising speeds upon level ground, it is desirable that the speed of the engine be dropped without increasing the speed of the vehicle. To this end the index lever 126 is moved to its high gear position, Figure 4, whereupon the motor 68 is again energized, at closed throttle, to effect the high gear setting of the transmission mechanism 24. It will be noted that with the above-described mechanism the desired setting of the transmission 24 may be preselected prior to a release of the accelerator: however, the clutch and transmission are not operated unless and until the accelerator is released.

There is disclosed in Figures 5, 6 and 7 further embodiments of the transmission control mechanism similar in general to the mechanism of Figure 1. The mechanism of Figure 5 includes a pilot or master three-way valve 134 similar to the valve of Figure 3 previously described, said valve being operated by a foot operated button 136 operably connected to the valve by link 138, a lever 140 and link 142. The valve 134 serves to alternately connect a transmission operating pressure differential operated motor, not shown, and of the type previously described, with the atmosphere and with an intake manifold 144 via conduits 146 and 148, a selector valve 150 of the type disclosed in Figure 2, and conduits 152 and 154. A conventional accelerator 156 serves to operate a throttle 158 by means of a link 160.

As described in Figure 6 the toe portion of an accelerator 162 is operatively connected to a throttle 164 by a link 166 and the heel portion thereof is operatively connected to a three-way valve 168, Figure 7, by a link 170. The connection between the link and throttle includes a slotted portion 171 to insure an operation of the valve 168 before the throttle is opened. The valve 168 functions, when moved to the position disclosed in Figure 7, to interconnect an intake manifold 172 with a selector valve 174 of the type previously described, and when released a return spring 176 functions to vent the valve to the atmosphere.

As to the operation of the mechanisms of Figures 5 and 6 to operate the transmission, the same is identical with that of the mechanism of Figure 1, with the exception that it is necessary to selectively or consciously operate the master or pilot valves 134 and 168 in order to effect a gear-changing operation of the transmission mechanism. With the mechanism of Figure 1, the pilot valve is automatically operated upon complete release of the accelerator.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a change-speed transmission, a source of power, and an accelerator, power means for operating said transmission comprising a pressure differential operated motor operably connected with said transmission, fluid transmitting means interconnecting said power source with said motor, valvular means for controlling the operation of said motor including a hand operated selector valve incorporated in said fluid transmitting means, and further including an accelerator operated three-way valve incorporated in said fluid transmitting means intermediate said power source and said selector valve.

2. In an automotive vehicle provided with an accelerator, a three-speeds forward and reverse transmission, a clutch forward of said transmission, and a two-speed rear axle, power means for operating the clutch, and a separate power means for operating the two-speed rear axle, an accelerator operated three-way valve for controlling the clutch operating power means and in part controlling the operation of the power means for operating the two-speed rear axle, and a hand operated double three-way selector valve mounted adjacent the steering wheel for in part controlling the operation of said rear axle operating power means.

ROBERT P. BREESE.